United States Patent
Dewa et al.

(10) Patent No.: US 12,443,017 B2
(45) Date of Patent: Oct. 14, 2025

(54) MAGNIFICATION ADJUSTABLE PROJECTION SYSTEM USING MOVABLE LENS PLATES

(71) Applicant: CORNING INCORPORATED, Corning, NY (US)

(72) Inventors: Paul Gerard Dewa, Newark, NY (US); Paul Francis Michaloski, Rochester, NY (US); Mark Christian Sanson, Macedon, NY (US)

(73) Assignee: CORNING INCORPORATED, Corning, NY (US)

( * ) Notice: Subject to any disclaimer, the term of this patent is extended or adjusted under 35 U.S.C. 154(b) by 540 days.

(21) Appl. No.: 17/979,348

(22) Filed: Nov. 2, 2022

(65) Prior Publication Data

US 2023/0137707 A1 May 4, 2023

Related U.S. Application Data

(60) Provisional application No. 63/274,684, filed on Nov. 2, 2021.

(51) Int. Cl.
  *G02B 15/14* (2006.01)
  *G02B 3/06* (2006.01)
  *G03F 7/00* (2006.01)

(52) U.S. Cl.
  CPC ............. *G02B 15/142* (2019.08); *G02B 3/06* (2013.01); *G03F 7/70183* (2013.01)

(58) Field of Classification Search
  None
  See application file for complete search history.

(56) References Cited

U.S. PATENT DOCUMENTS 8,218,130 B2* 7/2012 Van Dam ............ G03F 7/70425
  355/53
10,120,176 B2* 11/2018 Schicketanz ........ G03F 7/70275
  (Continued)

FOREIGN PATENT DOCUMENTS

| JP | 2013-219089 A | 10/2013 |
| JP | 2019-132907 A | 8/2019 |
| WO | 2021/019298 A1 | 2/2021 |

OTHER PUBLICATIONS

International Search Report and Written Opinion of the International Searching Authority; PCT/US2022/047789; dated Jan. 30, 2023; 13 pages; European Patent Office.

*Primary Examiner* — Robert E. Tallman
(74) *Attorney, Agent, or Firm* — Yiqun Zhao

(57) ABSTRACT

A magnification adjustable projection system includes an imaging system having a first pair of cylindrical lens plates located within an object or image space. The first pair of cylindrical lens plates includes a first cylindrical lens plate axially movable relative to a second cylindrical lens plate. A second pair of cylindrical lens plates is located within the object or image space in optical alignment with the first pair of cylindrical lens plates. The second pair of cylindrical lens plates includes a third cylindrical lens plate axially movable relative to a fourth cylindrical lens plates. First and second actuators adjusts distances between the first and second cylindrical lens plates and between the third and fourth cylindrical lens plates. The first and second pairs of cylindrical lens plates have first and second cylindrical transverse axes that are approximately 45° relative to each other.

22 Claims, 15 Drawing Sheets

(56) References Cited

U.S. PATENT DOCUMENTS

2008/0212183 A1* 9/2008 Uitterdijk ............... G03F 7/706
　　　　　　　　　　　　　　　　　　　　　　　　　359/554
2009/0303607 A1　12/2009 Noue et al.
2011/0122383 A1* 5/2011 Grejda ............... G02B 27/0025
　　　　　　　　　　　　　　　　　　　　　　　　　359/663

* cited by examiner

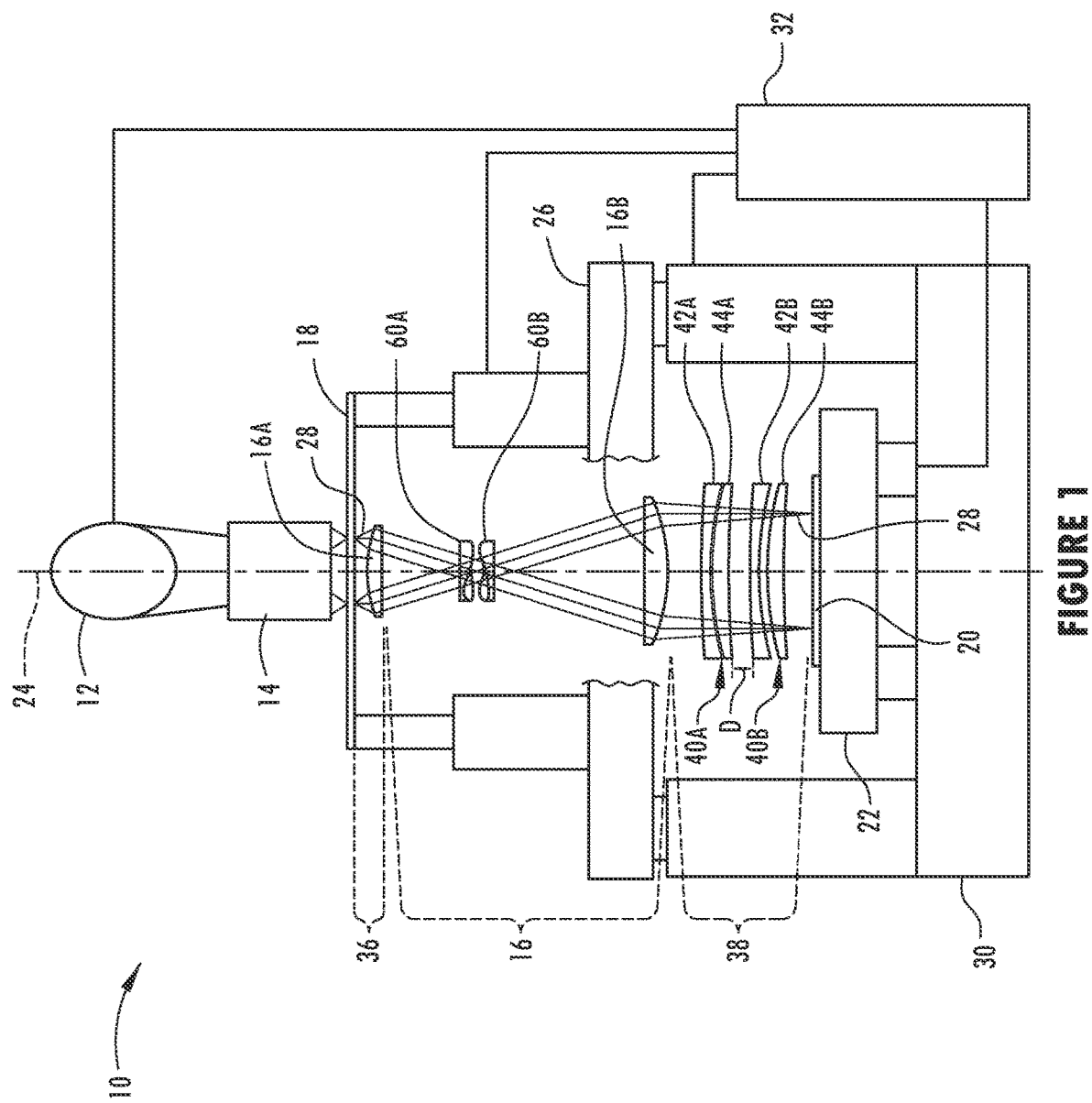

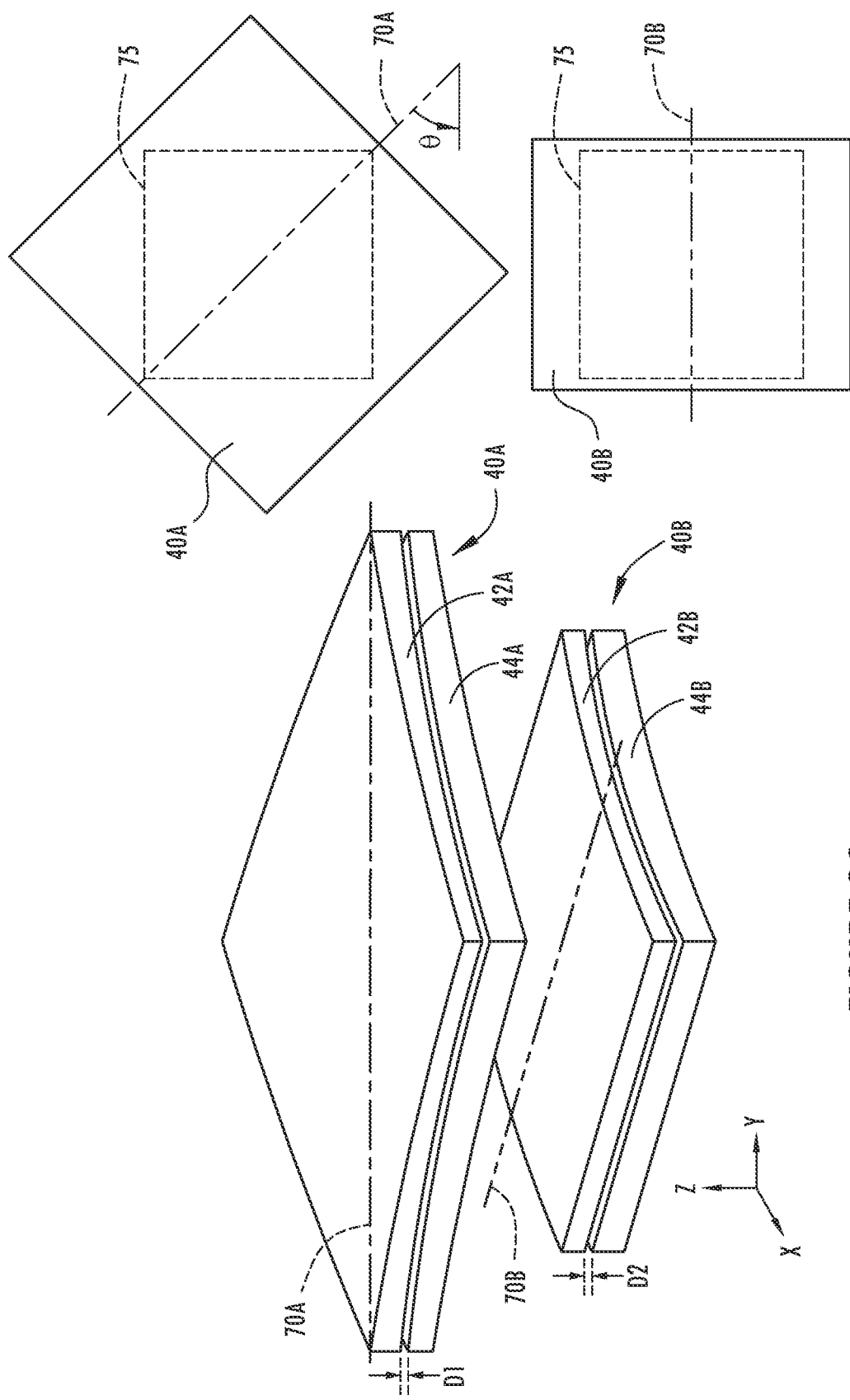

MAGNIFICATION ADJUSTABLE PROJECTION SYSTEM USING MOVABLE LENS PLATES

This application claims the benefit of priority to U.S. Provisional Patent Application Ser. No. 63/274,684 filed on Nov. 2, 2021, the content of which is relied upon and incorporated herein by reference in its entirety.

FIELD OF THE DISCLOSURE

The present disclosure generally relates to optical projection systems, and more particularly relates to a magnification adjustable projection system for magnifying projected patterns.

BACKGROUND OF THE DISCLOSURE

Lithographic projection systems commonly project patterns onto substrates for selectively exposing photosensitive layers at multiple stages during the manufacture of microcircuits and micro devices. Image magnification of the projected patterns is finely controlled to relate the patterns in successive exposures. Lithography requires precise alignment of the current exposed layer to a previous exposed layer on a substrate. The overlay generally has been achieved by alignment of the substrate to the image and magnification of the image by adjustments in the projection lens or mask position. It may be desirable to provide an adjustment of the anamorphic magnification in any clocking direction around the optical axis without experiencing excessive degradation of the image properties.

SUMMARY OF THE DISCLOSURE

According to one embodiment of the disclosure, a magnification adjustable projection system is provided. The magnification adjustable projection system includes an imaging system having an object or image space, a first pair of cylindrical lens plates located within the object or image space for contributing a first amount of magnification power to the imaging system, wherein the first pair of cylindrical lens plates includes a first cylindrical lens plate linearly movable relative to a second cylindrical lens plate, and a second pair of cylindrical lens plates located within the object or image space in optical alignment with the first pair of cylindrical lens plates, the second pair of cylindrical lens plates contributing a second amount of magnification power to the imaging system, wherein the second pair of cylindrical lens plates comprises a third cylindrical lens plate linearly movable relative to a fourth cylindrical lens plates, wherein the first pair of cylindrical lens plates are separated along the optical axis relative to the second pair of cylindrical lens plates. The system also includes a first actuator that adjusts a first distance between the first cylindrical lens plate and the second cylindrical lens plates for adjusting the first amount of magnification power, and a second actuator that adjusts a second distance between the third cylindrical lens plate and the fourth cylindrical lens plate for adjusting the second amount of magnification power, wherein the first pair of cylindrical lens plates has a first cylindrical transverse axis that extends substantially normal to an optical axis of the imaging system and the second pair of cylindrical lens plates has a second cylindrical transverse axis that extends substantially normal to the optical axis in the imaging system, wherein the first and second pairs of cylindrical lens plates are oriented such that the first cylindrical transverse axis is approximately 45° relative to the second cylindrical transverse axis.

According to another embodiment of the disclosure, a magnification adjustable projection system is provided. The magnification adjustable projection system includes an imaging system having an object or image space, a first pair of cylindrical lens plates located within the object or image space for contributing a first amount of magnification power to the imaging system, wherein the first pair of cylindrical lens plates includes a first cylindrical lens plate linearly movable relative to a second cylindrical lens plate, and a second pair of cylindrical lens plates located within the object or image space in optical alignment with the first pair of cylindrical lens plates, the second pair of cylindrical lens plates contributing a second amount of magnification power to the imaging system, wherein the second pair of cylindrical lens plates comprises a third cylindrical lens plate linearly movable relative to a fourth cylindrical lens plate, wherein the first pair of cylindrical lens plates are separated along the optical axis relative to the second pair of cylindrical lens plates. The system also includes a first actuator that adjusts a first distance between the first cylindrical lens plate and the second cylindrical lens plates for adjusting the first magnification, a second actuator that adjusts a second distance between the third cylindrical lens plate and the fourth cylindrical lens plate for adjusting the second amount of magnification power, wherein the first pair of cylindrical lens plates has a first cylindrical transverse axis that extends substantially normal to an optical axis of the imaging system and the second pair of cylindrical lens plates have a second cylindrical transverse axis that extends substantially normal to the optical axis in the imaging system, wherein the first and second pairs of cylindrical lens plates are oriented such that the first cylindrical transverse axis is approximately 45° relative to the second cylindrical transverse axis, and a projection lens assembly and an illuminator for illuminating a beam of light through the projection system and onto the first and second pairs of cylindrical lens plates, wherein the projection lens assembly further comprises a first rotating corrector plate located substantially parallel to a second rotating corrector plate, wherein the first and second rotating corrector plates each have a shaped surface and are movable relative to each other to correct for astigmatism.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

BRIEF DESCRIPTION OF THE DRAWINGS

FIG. 1 is a diagram of a lithographic projection system with two pairs of the movable lens plates within telecentric image space for providing magnification adjustment;

FIG. 2C is a perspective view of the two overlapping pairs of movable lens plates each having transverse axes arranged in different directions at forty-five degrees (45°) relative to each other;

FIG. 2D is a top exploded view of the first and second pair of movable lens plates oriented at a rotated transverse angle of forty-five degrees (45°);

DETAILED DESCRIPTION

Figure 2B:
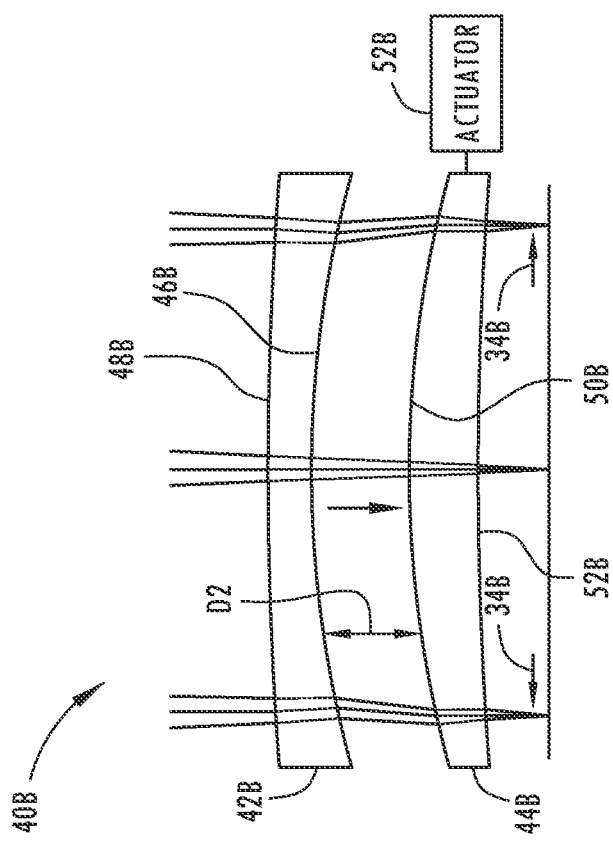
FIG. 2B is a side view of a second pair of movable lens plates shown in FIG. 1 in a second position.

Reference will now be made in detail to the present preferred embodiments, examples of which are illustrated in the accompanying drawings. Whenever possible, the same reference numerals will be used throughout the drawings to refer to the same or like parts.

The following detailed description represents embodiments that are intended to provide an overview or framework for understanding the nature and character of the claims. The accompanied drawings are included to provide a further understanding of the claims and constitute a part of the specification. The drawings illustrate various embodiments, and together with the descriptions serve to explain the principles and operations of these embodiments as claimed.

Referring to FIG. 1, a microlithographic projection system (tool) 10 is illustrated, as an example of a projection system which includes a light source 12, an illuminator 14, and a projection lens assembly 16 that serves as an imaging system for projecting an image of a reticle 18 onto a substrate 20. A horizontal X-Y-axis stage 22, which is translatable in two orthogonal directions normal to a common optical axis 24 of the illuminator 14 and the projection lens assembly 16, provides for relatively moving the substrate 20 with respect to the projection lens assembly 16 for exposing successive areas of the substrate 20. A vertical Z-axis stage 26 provides for relatively translating the projection lens assembly 16 with respect to the substrate 20 along the optical axis 24 to provide for appropriately focusing the image of the reticle 18 onto the substrate 20.

The light source 12 emits radiation in the form of a beam of light 28 appropriate for developing the photosensitive substrate 20. A variety of known devices can be used for the light source 12 including a lamp source, such as a high-pressure mercury arc lamp targeting certain spectral lines, or a laser source, such as an excimer laser, particularly for operating within the ultraviolet spectrum.

The illuminator 14 provides for shaping and spatially distributing the light beam 28 and targeting angular and spatial irradiance profiles set for both the pupil and image plane of the projection lens assembly, the latter coinciding with the substrate 20. Although not shown in detail in FIG. 1, typical illuminators for microlithographic operations include a profiler for collecting and shaping the beam 28, a uniformizer (e.g., a kaleidoscope or fly's eye array) for integrating the light into a uniform irradiance field, and a relay lens for relaying an image of the output of the uniformizer to the reticle 18, where an image plane of the illuminator 14 coincides with an object plane of the projection lens assembly 16.

The projection lens assembly 16 is shown in a simplified view having a first lens element 16A receiving the beam of light from the illuminator 14 and a second lens element 16B outputting the light to the first and second pairs of movable lens plates 40A and 40B. The projection lens assembly 16 may include more than two lens elements such as twelve to thirty elements, for example. The first lens element 16A has a posterior surface on the upper light input side and the second lens element 16B has a posterior surface on the lower light output side. The first lens element 16A is spaced from the second lens element 16B so as to create a desired size beam of light entering the first and second pairs of movable lens plates 40A and 40B. Disposed between the first and second lens elements 16A and 16B are first and second corrector lens plates 60A and 60B which is in the pupil region of the projection. The projection lens assembly 16, which may have an entrance numerical aperture (NA) larger than an exit numerical aperture of the illuminator 14 for providing partial coherent imaging, projects an image of the reticle 18 onto the substrate 20. That is, a pupil (not shown) of the projection lens assembly 16, which is typically conjugate to a pupil (also not shown) in the illuminator 14, may be underfilled by the image of the illuminator pupil but is sized to collect angularly divergent light from illuminated features of the reticle 18 to produce a high resolution image of the reticle 18 on the substrate 20. The projected image of the reticle 18 can be enlarged or reduced as required by shifting height of the reticle or one or more lens elements within the projection lens assembly 16. Reduction or enlargement is a rotationally symmetrical magnification change which may be needed for achieving full clocking range of anamorphic magnification. The projection lens assembly 16 can include reflective or diffractive elements as well as refractive elements or combinations of such elements, such as in catadioptric optics.

The reticle 18, also referred to as a "mask," includes one or more patterns intended for projection onto the substrate 20 and can be sized within or beyond the field captured by the projector lens assembly 16. Reticles with larger patterns can be relatively translated with respect to the projection lens assembly 16 to expose different parts of the reticle patterns in succession.

The photosensitive substrate 20 is shown generally in the form of a flat plate, such as a semiconductor wafer or glass panel treated with a photoresist to react to exposures of light. Often, the entire substrate 20 cannot be imaged at once, so the horizontal X-Y-axis translational stage 22 on a base 30 provides for translating the substrate 20 through a range of positions for collectively illuminating a desired working area of the substrate 20. The projection lens assembly 16 is supported on a stage 26 above the base 30. The substrate 20 may be adjusted vertically to adjust the image distance of the projection lens assembly 16 from the substrate 20 along the optical axis 24 to maintain focus. A controller 32 coordinates relative motions among the projection lens assembly 16, the reticle 18, and the substrate 20 as well as the exposure of the projection system 10.

First and second pairs of movable cylindrical lens plates 40A and 40B are shown located below the projection lens assembly 16 within a telecentric image space 38 of the projection lens assembly 16. The first and second pairs of movable cylindrical lens plates 40A and 40B each have two cylindrical lens plates with top and bottom curved cylindrical shaped surfaces having cylindrical transverse axes for the shaped surfaces with each pair of movable lens plates 40A and 40B, the individual lens plates move axially with respect to each other. Although shown in telecentric image space 38 adjacent to the substrate 20, the first and second pairs of movable cylindrical lens plates 40A and 40B could also be located in telecentric object space 36. The choice can be made largely on the basis of space and access considerations. In either or both locations, the first and second pairs of movable cylindrical lens plates 40A and 40B can control magnification in a lithographic projection system that is telecentric in both image and object space.

The first pair of movable cylindrical lens plates 42 includes a first cylindrical lens plate 42A axially aligned with a second cylindrical lens plate 44A. The first cylindrical lens plate 42A is axially movable along the optical axis 24 relative to the second cylindrical lens plate 44A. Similarly, the second pair of cylindrical lens plates 40B includes a third cylindrical lens plate 42B axially movable along the optical axis 24 relative to a fourth cylindrical lens plate 44B. The first pair of cylindrical lens plates 40A are located within the object or image space for contributing a first amount of magnification power to the imaging system. The second pair of cylindrical lens plates 40B are located within the object or image space in optical alignment on optical axis 24 with the first pair of cylindrical lens plates 40A and contribute a second amount of magnification power in the imaging system. The first pair of cylindrical lens plates 40A are separated by an axial distance D in the range of about 2 to 10 mm, for example, along the optical axis 24 relative to the second pair of lens plates 40B.

A first actuator 52A is operatively coupled to one of the first pair of movable cylindrical lens plates, specifically shown operatively coupled to the second cylindrical lens plate 44A. The first actuator 52A may include an electric motor that actuates the second cylindrical lens plate 44A to move relative to the first cylindrical lens plate 42A axially along optical axis 24 between a first position shown in FIG. 2A and an extended position separated and distanced from the first cylindrical lens plate 42A by distance D2. Similarly, a second actuator 52B is operatively coupled to the second pair of movable cylindrical lens plates 40B, particularly shown operatively coupled to the fourth cylindrical lens plate 44B for actuating the fourth cylindrical lens plate 44B to move relative to the third cylindrical lens plate 42B axially along optical axis 24. The second actuator 52B may include an electric motor for moving the fourth cylindrical lens plate 44B from a position in close contact to the third cylindrical lens plate 42B to an extended position separated from the third cylindrical lens plate 42B by distance D2 as shown in FIG. 2B.

Figure 2A:
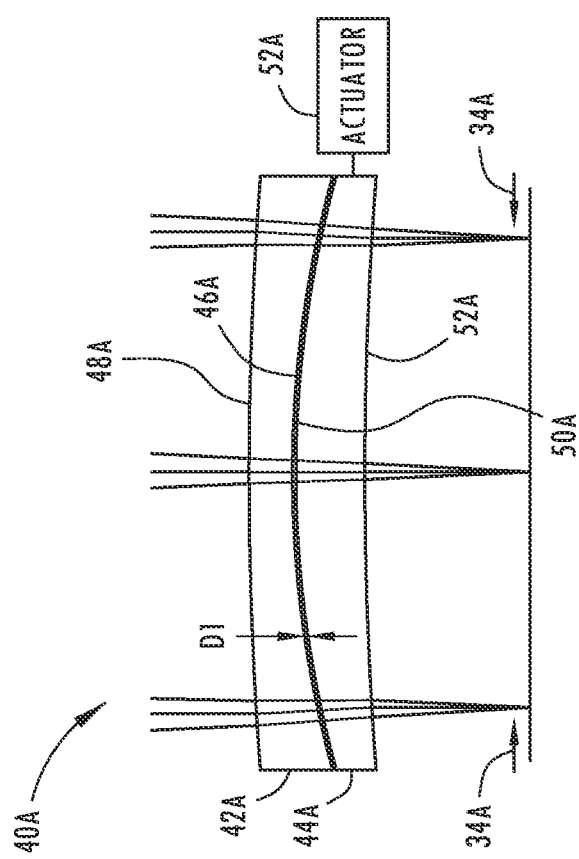
FIG. 2A is a side view of a first pair of movable lens plates shown in FIG. 1 in a first position.

The first cylindrical lens plate 42A has a slightly curved cylindrical upper posterior surface 48A and a greater curved cylindrical lower anterior surface 46A. The second cylindrical lens plate 44A has a curved cylindrical upper posterior surface 46A and a slightly cylindrical lower anterior surface 52A. Each of the upper surface 48A and lower surface 52A are slightly curved in the shape of a partial cylinder having a transverse axis defining the longitudinal axis of the cylinder. The lower anterior surface 50A of the first cylindrical lens plate 42A and the posterior surface 46A of the second cylindrical lens plate 44A each have a curved cylindrical surface that is substantially similar or identical in shape with a substantially similar radius of curvature and conform to one another when the first and second cylindrical lens plates 42A and 44A abut one another as shown in FIG. 2A. Each of the anterior surface 50A and posterior surface 46A is curved in the shape of a partial cylindrical having radius of curvature and a transverse axis defining the longitudinal axis of the cylinder.

The third cylindrical lens plate 42B has an upper posterior surface 48B and a lower anterior surface 46B. The fourth cylindrical lens plate 44B has an upper posterior surface 46B and a lower anterior surface 52B. The upper surface 48B and lower surface 52B are slightly curved each with a partial cylindrical shape having a transverse axis. The lower anterior surface 46B of the third cylindrical lens plate 42B and the posterior surface 50B of the fourth cylindrical lens plate 44B each have a greater and substantially similar cylindrical shaped surface with a substantially similar radius of curvature and a transverse axis such that both surfaces conforms to one another such that the cylindrical surfaces 46B and 50B may abut one another.

Referring to FIGS. 2C and 2D, the upper first pair of cylindrical lens plates 40A is shown having both the first and second cylindrical lens plates 42A and 44A each having cylindrical shaped surfaces each curved about a cylindrical transverse axis 70A extending substantially normal to the optical axis 24 and between a pair of opposing corners. The bottom pair of cylindrical lens plates 40B are shown having the third and fourth cylindrical lens plates 42B and 44B each curved about a second cylindrical transverse axis 70B extending substantially normal to the optical axis 24 and midway through opposite sides of the lens plates 42B and 44B. The first and second pairs of movable lens plates 40A and 40B are oriented such that the first cylindrical transverse axis 70A is approximately forty-five degrees (45°) relative to the second cylindrical transverse axis 70B. As seen, the first pair of movable lens plates 40A may be larger in size than the second pair of movable plates 40B due to the forty-five degree (45°) relative rotation in order to overlap and cover the entire same imaging field shown by dashed lines 75.

The first pair of movable cylindrical lens plates 40A is located within the object or image space for contributing a first magnification power to the imaging system as a function of the amount of cylindrical curvature of the first and second cylindrical lens plates 42A and 44A and the distance D1 between the first and second cylindrical lens plates 42A and 44A. The second pair of movable cylindrical lens plates 40B is also located within the object or image space for contributing a second amount of magnification power to the imaging system as a function of an amount of the cylindrical curvature of the third and fourth cylindrical lens plates 42B and 44B and the distance D2 between the third and fourth cylindrical lens plates 42B and 44B. The first and second cylindrical lens plates 42A and 44B are movable axially relative to each other and a third and fourth cylindrical lens plates 42B and 44B are likewise movable axially relative to each other to change the magnification of light passing through the first and second pairs of movable lens plates 40A and 40B. With the first and second lens plates 42A and 44A abutting one another with distance D1 equal to about zero as shown in FIG. 2A, an inner radii and air gap do not act on the rays significantly, and the outer radii form the equivalent of a glass bent plate, or cylindrical glass lens with little or no optical power. The anamorphic magnification decreases the image size in the Y direction, but not in the X direction. When the distance D2 is increased between two of the movable lens plates as shown in FIG. 2B, the cylindrical power of an air lens formed between the two lens plates 42B and 44B will counteract the cylindrical power of the glass lenses. The air lens may operate as a bent plate of air or cylindrical air lens with little or no optical power. The radii may be designed to have no anamorphic magnification at midtravel of the elements. This enables the projection system 10 to generate continuously variable anamorphic magnification of both signs (inward and outward) by continuously varying the air space size. The static cylindrical glass lens generated by the outer radii provide an offset in anamorphic magnification that allows the various thickness cylindrical lenses to produce both signs of anamorphic magnification. It should be appreciated that one or the other or both of the first and second cylindrical lens plates 42A and 44A and that one or the other or both of the second cylindrical lens plates 42B and 44B may be moved to change the size of the air lens between the corresponding lens plates.

The projection system 10 shown in FIG. 1 provides one example of an enlarging magnification. Each of lens plates 42A and 42B are configured as negative cylinder lenses and lens plates 44A and 44B are configured as positive cylinder lenses, in the example shown. However, the projection system 10 may likewise be applied to a reducing magnification system. Each of the first, second, third and fourth lens plates 42A, 44A, 42B, 44B may be made of optical glass, such as glass, in either an anamorphis or crystalline form to provide for the transmission of light without generating unnecessary wave front aberrations or departures from uniformity.

A relatively pure magnification change accompanying a cylindrical distortion of the lens plates can be derived by considering how a tilted plate laterally deviates the telecentric rays. The deviation may be a function of the tilt, thickness and refractive index of the lens plate. The telecentric rays are the rays that pass through the center of the aperture stop of the imaging lens and are parallel in the telecentric image or object space. A lens plate with cylindrical shaped surfaces can be considered on a localized level as a plurality of individually tilted plates whose tilt increases by a sign function with distance from the optical axis, and the relationship between ray deviation and distance from the optical axis is highly linear for small curvatures. This linearity means that the deviations are proportional to the distance from the optical axis and the deviations have predominantly changed only the magnification of the image in the direction of the curvature and not the distortion.

The first and second pairs of movable cylindrical lens plates 40A and 40B may have no optical power, so as to maintain telecentricity across the field, and to avoid other aberrations. Spherical and axial color aberrations may occur when focusing through a glass plate. The projection lens assembly 16 can be designed to have the opposite spherical and axial color of that induced by the first and second pairs of movable cylindrical lens plates 40A and 40B so that the aberrations will cancel. Astigmatism may be produced when imaging through the cylindrical glass lens plates or air plates between each of the two pairs of cylindrical glass lens plates. This astigmatism may change the orientation as the first and second pairs of movable cylindrical lens plates 40A and 40B are actuated for different magnitudes and clockings of anamorphic magnification, such that dynamic correction may be needed. The astigmatism produced may be largely uniform over the field.

Figure 3B:
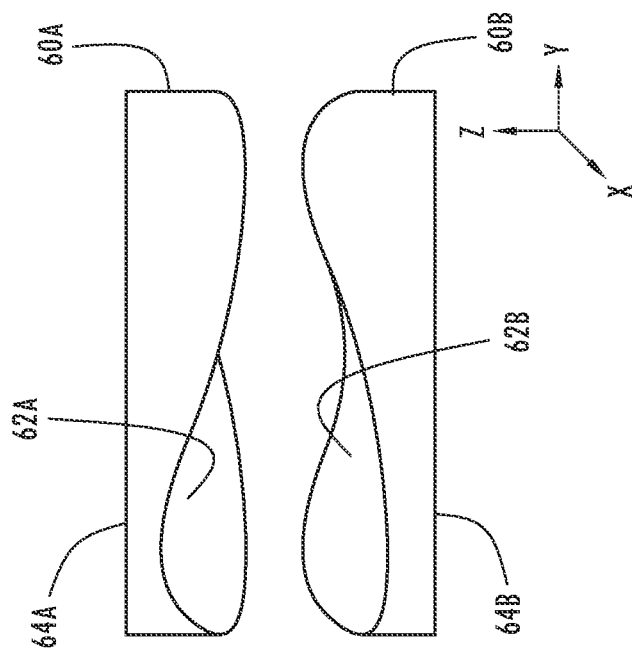
FIG. 3B is a side view of the pair of rotating corrector plates shown in FIG. 3A.
Figure 3A:
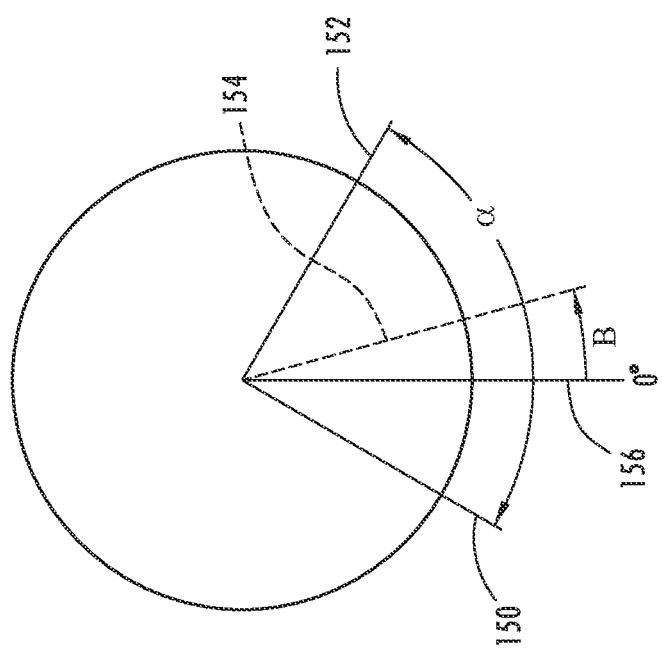
FIG. 3A is a top view of a pair of rotating corrector plates for use in the projection system, according to one example.

In order to correct for the astigmatism, the projection lens assembly 16 includes first and second rotating corrector plates 60A and 60B which are shown in more detail in FIGS. 3A and 3B. The first and second rotating corrector plates 60A and 60B are located in the pupil space of the projection lens assembly 16 between lenses elements 16A and 16B and can generate the opposite astigmatism at any clocking over the image field that is created by the use of the first and second pairs of movable lens plates 40A and 40B. The interfacing surfaces of the first and second rotating corrector plates 60A and 60B have respective shaped surfaces 62A and 62B that depart from a planar surface. The opposing surface 64A and 64B are shown as generally planar. The shaped surfaces may each be in shape of a sag which is a shape of the astigmatism that is created. This may be a hyperbolic paraboloid or a saddle shape as shown in FIG. 3B. The shape may be the fifth Fringe Zernike term that is in cylindrical coordinates defined as $Z_5 R^2 \cos(2\theta)$, where R is the distance from the optical axis and $\theta$ is the clocking around the perimeter of the round corrector plates 60A and 60B. The $Z_5$ is the Zernike coefficient that is a distance of half of the peak-to-valley (P-V) of the shape. The Sixth Zernike uses sine instead of cosine, so it is the same shape but rotated forty-five degrees (45°). The summation of both shapes with a set of these two coefficients can generate astigmatism of any magnitude and clocking. This summation is analogous to the use of zero degrees (0°) and forty-five degrees (45°) cylinder pairs to generate anamorphic astigmatism of varying magnitude and clocking. The two rotating corrector plates 60A and 60B have the saddle shapes rotated ninety degrees (90°) from each other, so that when they have the same clocking, they cancel and no astigmatism is generated. The first and second rotating corrector plates 60A and 60B are rotated relative to one another as seen in FIG. 3A. This may be achieved by rotating either the first or second rotating corrector plate with the other corrector plate fixed or rotating both corrector plates, with an actuator. As the difference in clocking increases, the magnitude of the generated astigmatism increases. The clocking of that astigmatism is set by the average of the two clockings. The amount of correction depends on the anamorphic magnification, the distance from the deformable lens plates from the image plane, and the numerical aperture of the imaging system. This correction method allows the projection system 10 to stay on a straight line optical axis (on-axis). Another method may be to introduce mirrors and produce an off-axis system with a MEMS deformable mirror.

The following is an example of a projection system that uses a numerical aperture of 0.065, an image field of 250×250 mm, and a spectral bandwidth from 363-370 nm (i-line of Hg). The terms magnification and anamorphic magnification are used to describe the relationship of image point placements over a field relative to the object. The calculations shown in Table 1 below use a 9×9 array of field points to create a field that is then fitted to 3 distortion terms multiplied by coefficients: magnification (Mag), anamorphic magnification (AnaMag) and Skew. Anything residual to this fitting is considered residual distortion. The Mag distortion term is the change in magnification from the system fundamental magnification. The Δx and Δy are the image displacement from the nominal positive of the image point based on the fundamental magnification of the system, and x and y are the distance in x and y to that nominal point on the image plane from the optical axis.

TABLE 1

| Distortion Term Name | Equation |
| --- | --- |
| Magnification | Δx = x * Mag |
|  | Δy = y * Mag |
| Anamorphic Magnification | Δx = x * AnaMag |
|  | Δy = −y * AnaMag |
| Skew | Δx = y * Skew |
|  | Δy = x * Skew |

Figure 4A:
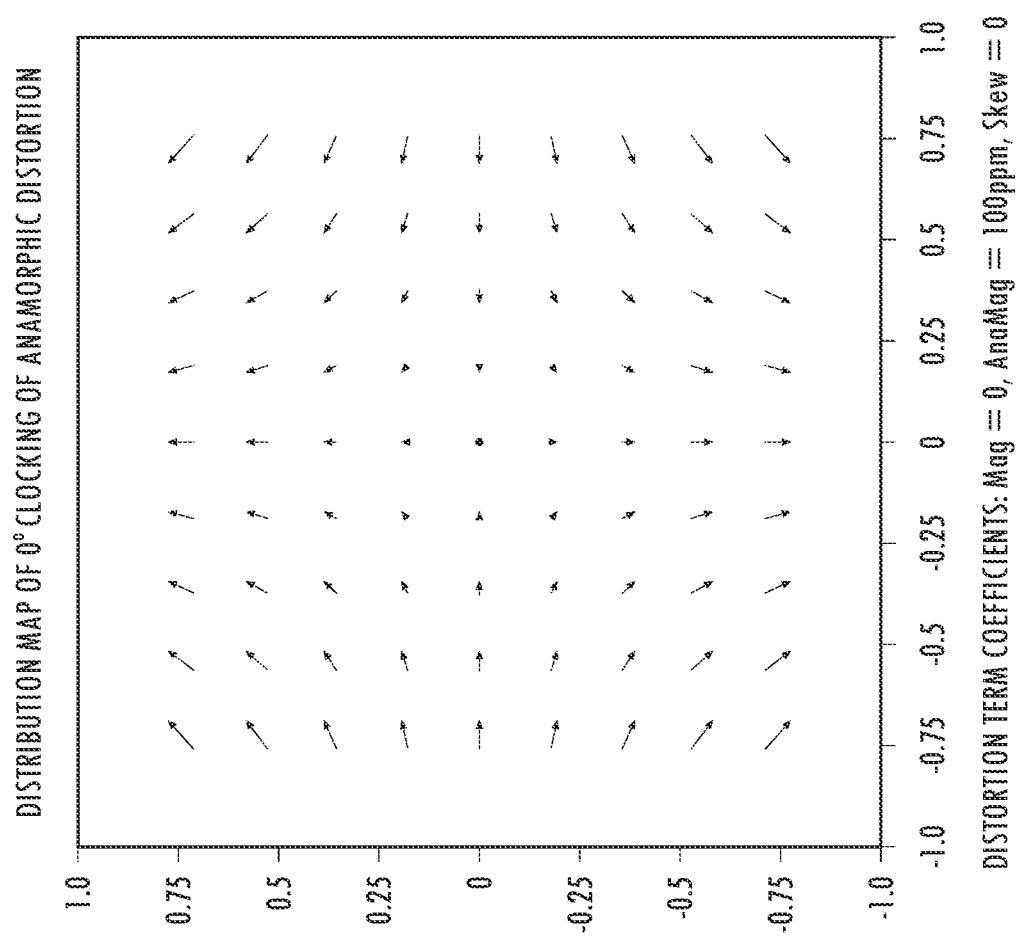
FIG. 4A is a field distortion map showing 0° clocking of anamorphic magnification distortion in the image space.
Figure 4B:
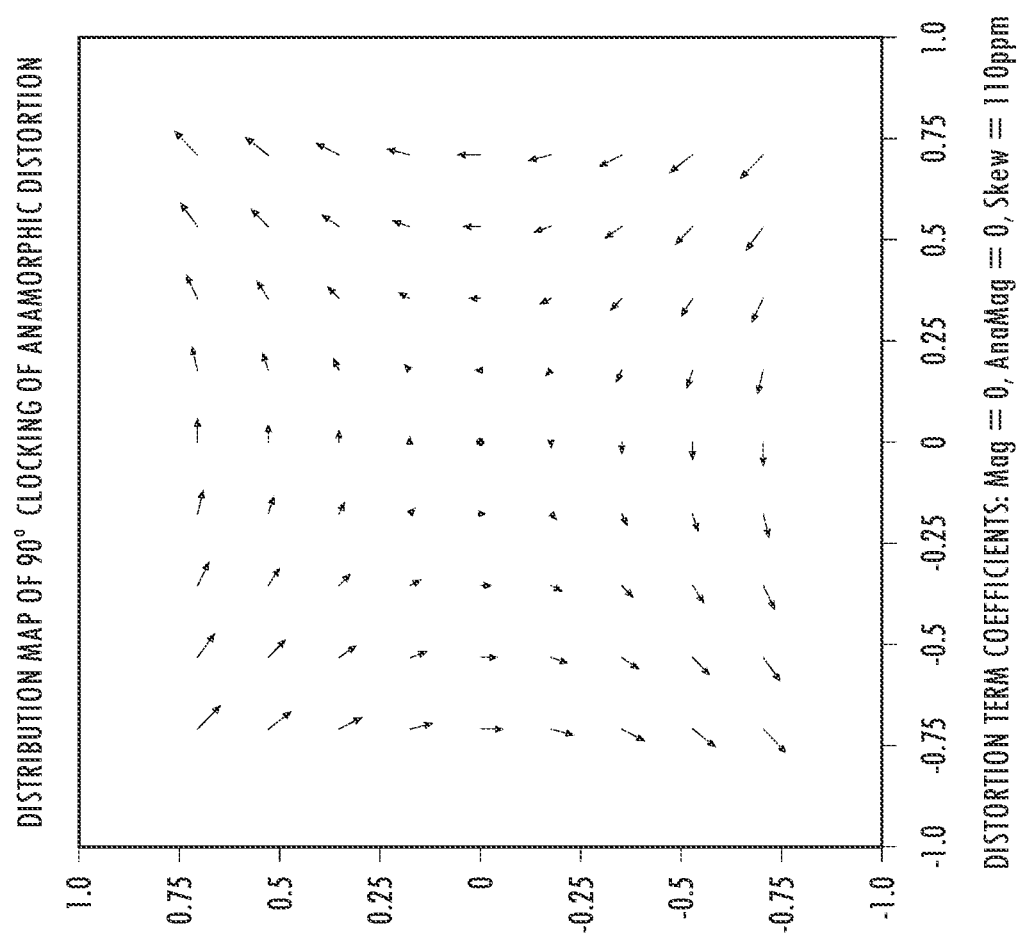
FIG. 4B is a field distortion map showing 90° clocking of anamorphic magnification distortion rotated as skew in the image space.

Skew is anamorphic magnification rotated which is stretching the corners of the field, while AnaMag stretches the flats. FIGS. 4A and 4B show a field distortion map of both AnaMag and Skew. The sum of the AnaMag term and Skew terms can describe all 360° anamorphic clockings. The corners might be 45° from the flats, but note that each vector in the two maps has rotated 90° and the clocking of the anamorphic magnification is 0° and 90°. The field distortion maps are independent over 360° of clocking. The root sum square (RSS) of the coefficients gives the magnitude of the anamorphic astigmatism. The coefficients are relative to the size of the field in parts per million (ppm). According to one example, an adjustment of at least 100 ppm of anamorphic magnification may be achieved, which is the direction of max expansion is 100 ppm, and the perpendicular to that direction is contracted at −100 ppm. There is 200 ppm difference between the orthogonal directions, but is considered 100 ppm of anamorphic mag.

The weak outer radii of a cylinder lens plate pair defines the glass curved plate when the two lenses are close, and is an offset that allows the moving cylinder lens plate to start at one sign of anamorphic mag and reach the opposite sign at the end of the travel, and passing through 0 at mid-travel. The strong inner radii may need to be strong because the air bent space created by the gap needs to change the anamorphic mag by twice as much as the glass curved plate, using air as a medium, and not glass. The starting parameters to start the design is the width of the lens plates (W), the strong inner radius $R_{in}$, the total glass thickness of the pair (T), and the index (n) of the chosen glass. The total thickness is a compromise between difficulty of fabrication and total length of the two pairs of the lens plates. From this a first order design of one pair may be obtained.

$$\text{The length of travel of one lens is} = 2\sqrt{2}\,\frac{R_{in}\Delta r}{W(n-1)},$$

where Δr is the max displacement needed at the corner of the field, where n is the refractive index of the glass. The outer radius is $$R_{out} = \frac{W(n-1)T}{\sqrt{2}\,n\Delta r}.$$

These equations provide a starting design that can be adjusted slightly in an optical design program for optical power and lens plate travel needed. Since the 45° pair of cylindrical lens plates has more sag for the same inner radius, more center thickness may be needed. The design provided in table 2 is for W=300 mm, Rin=5 m and a total glass thickness of 22 mm for the 45° pair of lens plates, and 16 mm for the 0° pair of lens plates.

TABLE 2

Example design in the image space of a projection system

| ELT | SUR NO. | SURFACE DESCRIPTION | | | | THICKNESS OR | GLASS |
| --- | --- | --- | --- | --- | --- | --- | --- |
| | | RADIUS | | | | SEPARATION | |
| | | X | Y | | SHAPE | | |
| 45 deg pair of cylinder lenses | | | | | | | |
| coordinates rotated −45 deg | | | | | | | |
| 45+ | 1 | INF | −33045.00 | | CC CYL | 13.0000 | Fused Silica |
| 45+ | 2 | INF | −5002.000 | | CX CYL | 0.1500* | |
| 45− | 3 | INF | −5002.000 | | CC CYL | 9.0000 | Fused Silica |
| 45− | 4 | INF | −33045.00 | | CX CYL | 7.3000* | |
| coordinates rotated +45 deg | | | | | | | |
| 0 deg pair of cylinder lenses | | | | | | | |
| 0+ | 5 | INF | −24300.00 | | CC CYL | 9.0000 | Fused Silica |
| 0+ | 6 | INF | −5002.000 | | CX CYL | 0.1500** | |
| 0− | 7 | INF | −5002.000 | | CC CYL | 7.0000 | Fused Silica |
| 0− | 8 | INF | −24300.00 | | CX CYL | 21.0000** | |
| | IMAGE | | INF | | | FLT | |

Figure 5:
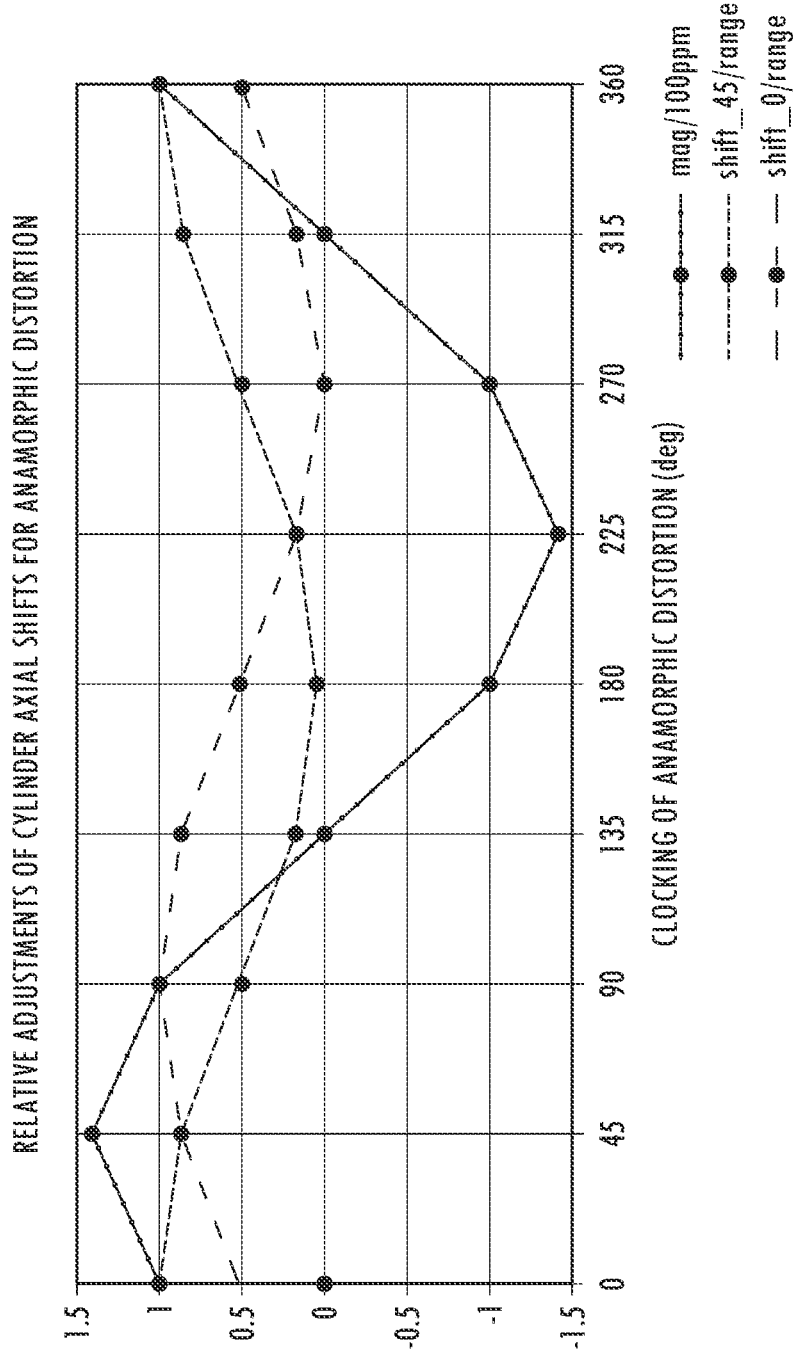
FIG. 5 is a graph illustrating the relative adjustments of cylinder axial shifts of the pairs of lens plates for anamorphic distortion throughout the anamorphic clocking.
Figure 6:
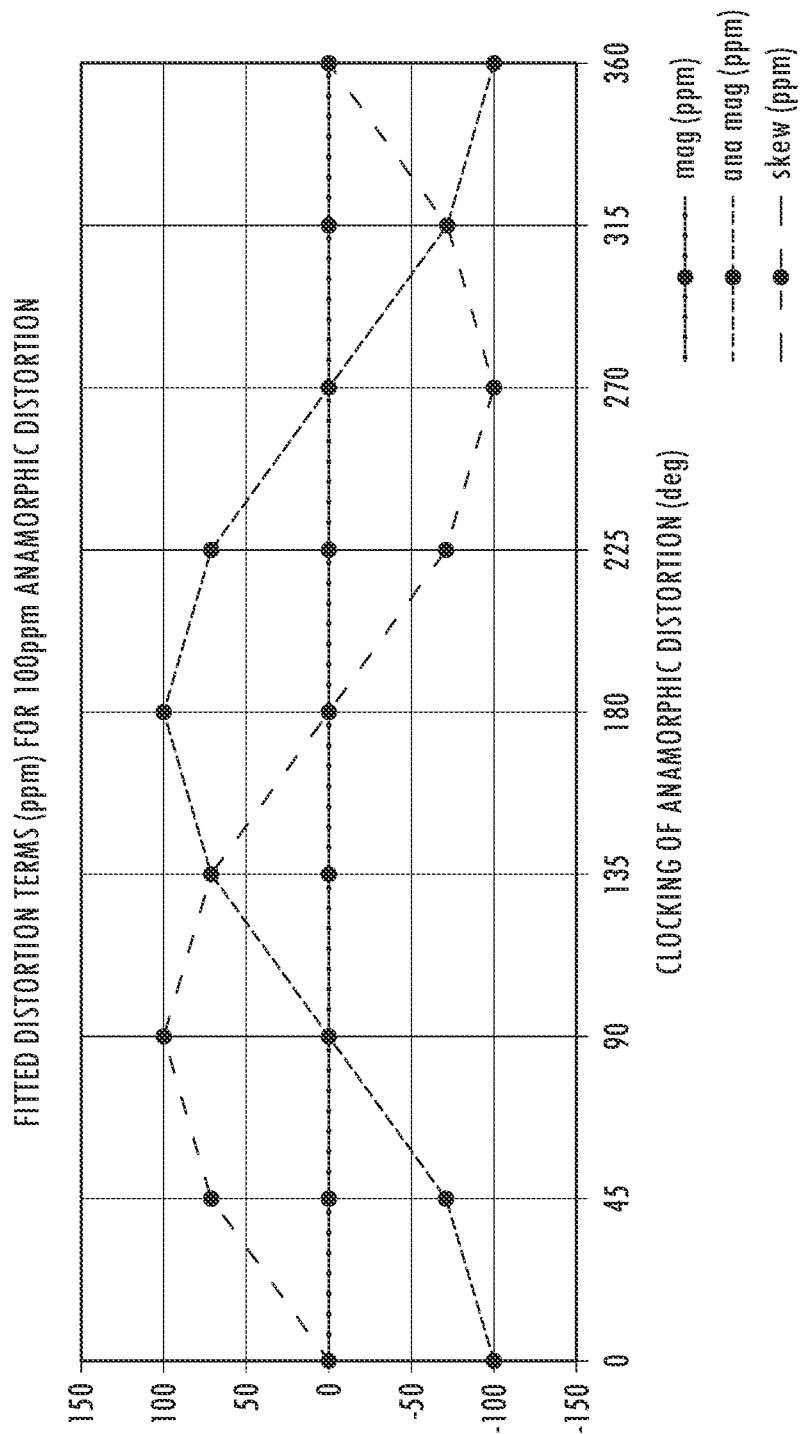
FIG. 6 is a graph illustrating fitted distortion terms for 100 ppm anamorphic distortion throughout the anamorphic clocking.

Dimensions are given in millimeters
*Internal air space adjusts from 0.15-5.15 mm and air space below lens adjusts 7.30-2.00 mm
**Internal air space adjusts from 0.15-5.45 mm and air space below lens adjusts 21-15.7 mm FIG. 5 shows the motions in relative adjustments of cylinder axial shift of the lens plates needed to obtain the anamorphic mag in all clockings as shown in FIG. 6. The RSS of the Skew and AnaMag coefficients give the magnitude of the anamorphic magnification. To obtain an anamorphic mag of 100 pm at all clockings with no mag residual, the mag needs to adjust ±√2×100 ppm. This mag adjust can be accomplished by shifting elements in the projection lens axially, or shifting the mask axially.

The 0.5 relative adjustment is the mid-travel of the movable cylindrical lens plates, where there is no anamorphic contribution. If less than 100 ppm of anamorphic mag is desired, then the sinusoidal cylinder shift curves in FIG. 5 would decrease in amplitude to the 0.5 relative adjustment line, and the mag adjustment to the 0 line.

The addition of the cylinders in the image space, is similar to adding plates. In telecentric imaging, there is spherical and axial color aberration introduced, that is easily corrected in the projection lens design. The max vector produced in the field for the resultant fits in FIG. 6 is 17.7 um. The residual distortion from these fits are shown in FIG. 7.

Figure 7:
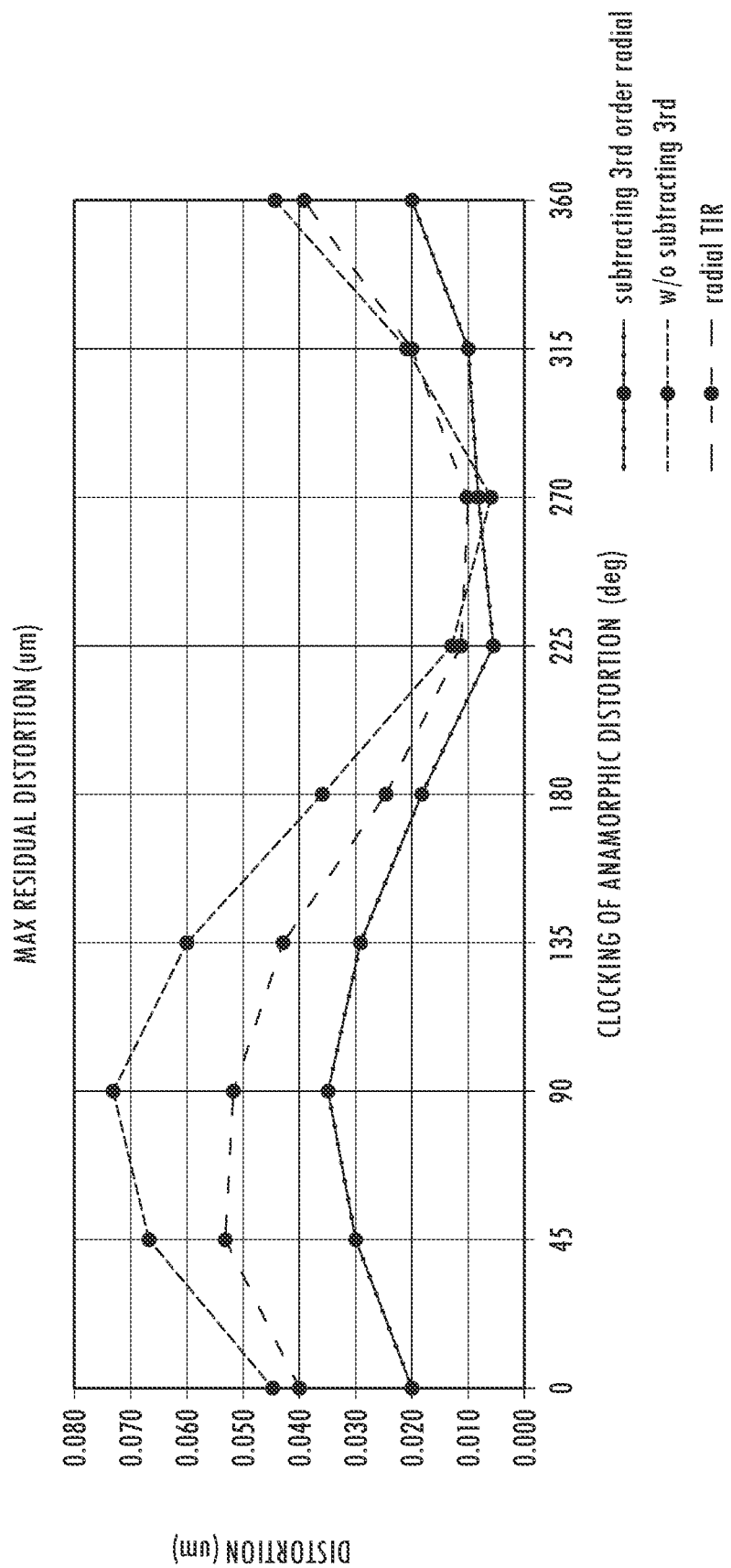
FIG. 7 is a graph illustrating maximum residual distortion of the image over the field throughout the anamorphic clocking.

FIG. 7 is the residual distortion which is 0.07/17.7=0.004 of the generated anamorphic mag, which is generally acceptable. If some improvement is desired, some 3rd order radial distortion could be removed in the projection lens design. The design of cylindrical lens plates based on the inner radii=10 m has a max residual distortion of 0.017 um, which is 4 times better. The longer radius designs require more travel of the cylinders, and thus more image space.

Figure 8:
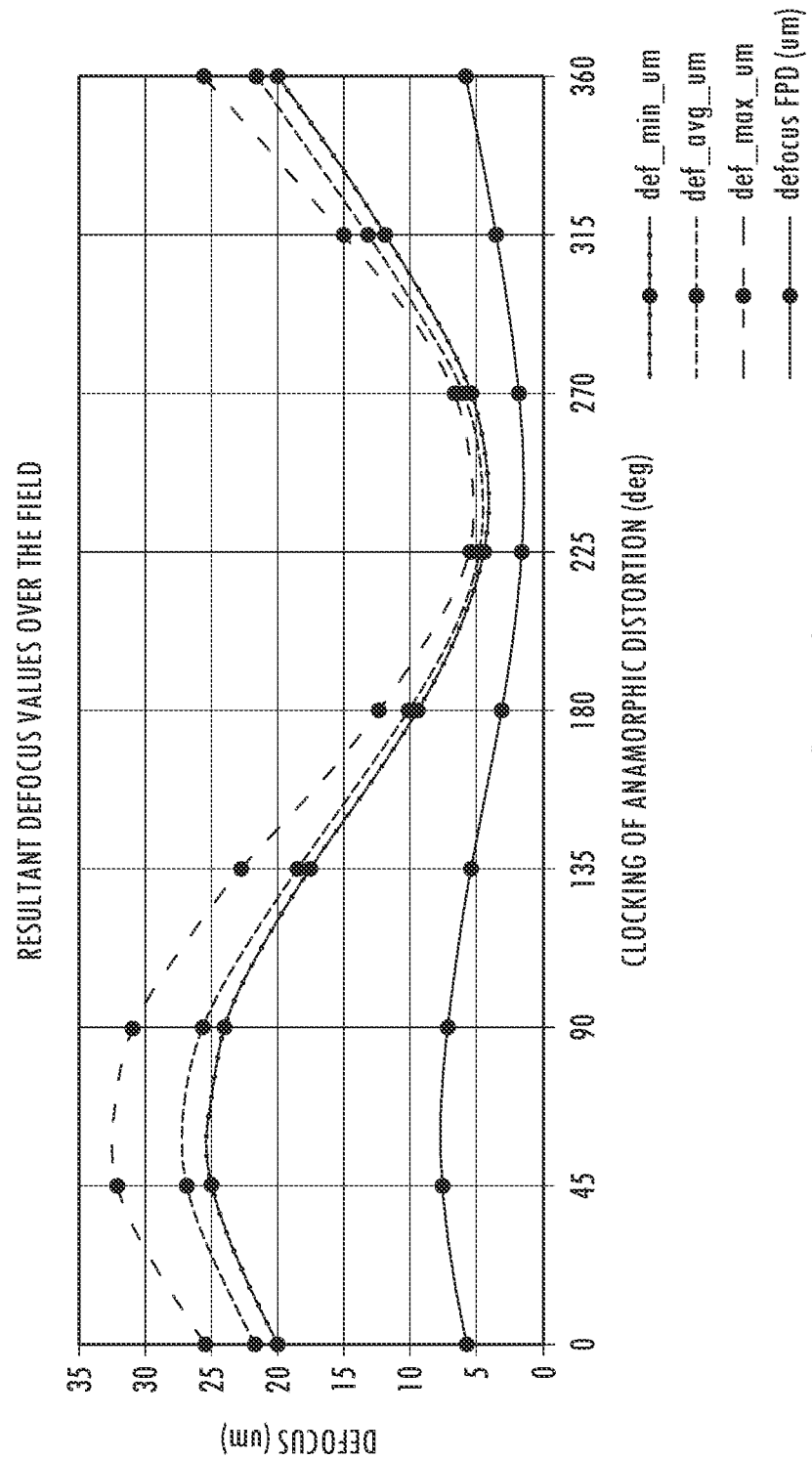
FIG. 8 is a graph illustrating resultant defocus value of the image over the field throughout the anamorphic clocking.

The min, max and average values of FIG. 8 for the distribution of defocus values over the whole field. For each setting of anamorphic mag, the projection system 10 may adjust the height of the wafer to best focus. This is a routine correction used in all precise lithography systems. What cannot be corrected is the variation of focus over the field, which is the focal plane deviation (FPD) which is defined here as the max minus min focus. The quarter wave depth of focus for this projection system may be ±44 um in one example, and 8 um of FPD generated by the cylindrical lens plates may be acceptable.

Figure 9A:
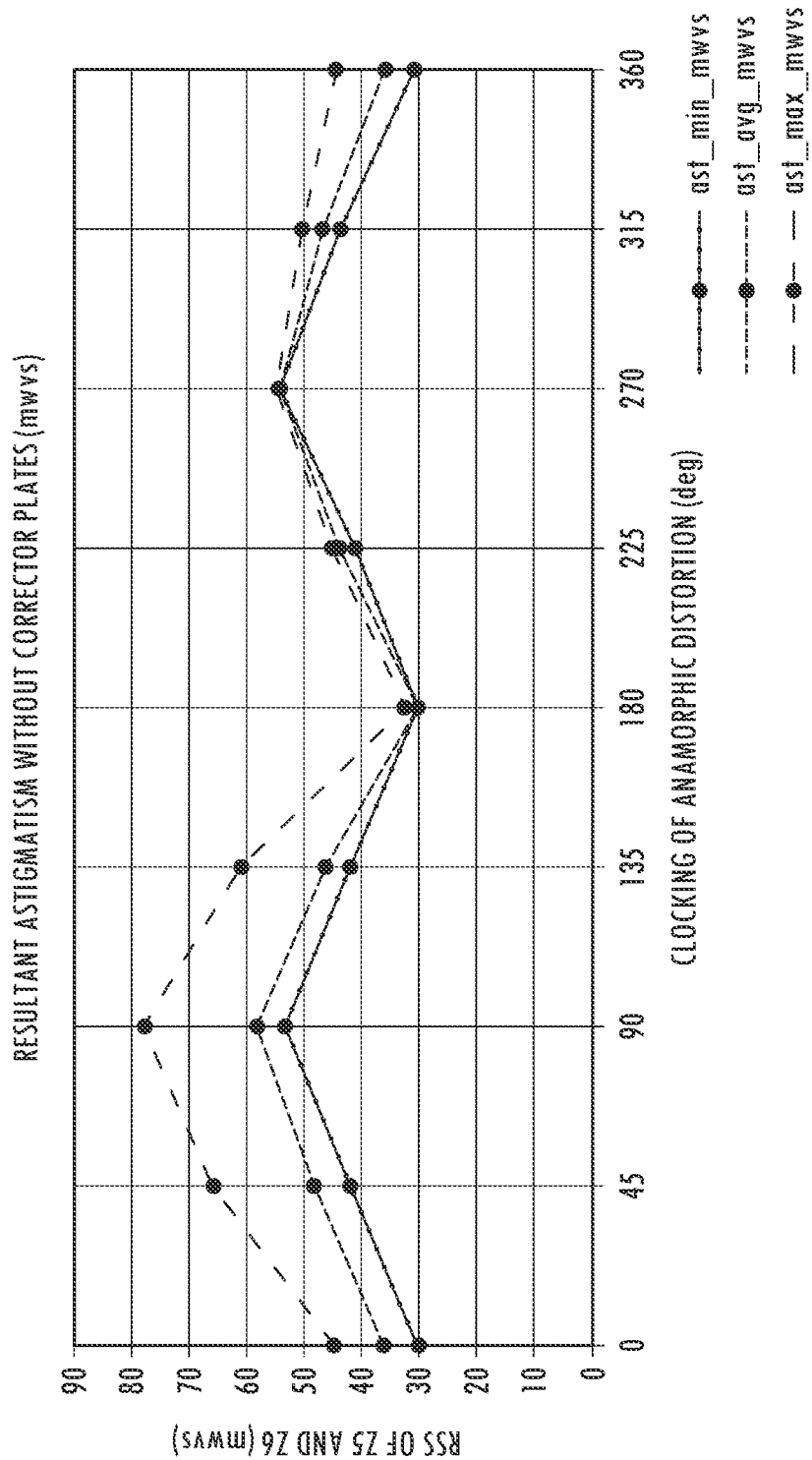
FIG. 9A is a graph illustrating resultant astigmatism without the rotating corrector plates throughout the anamorphic clocking.
Figure 9B:
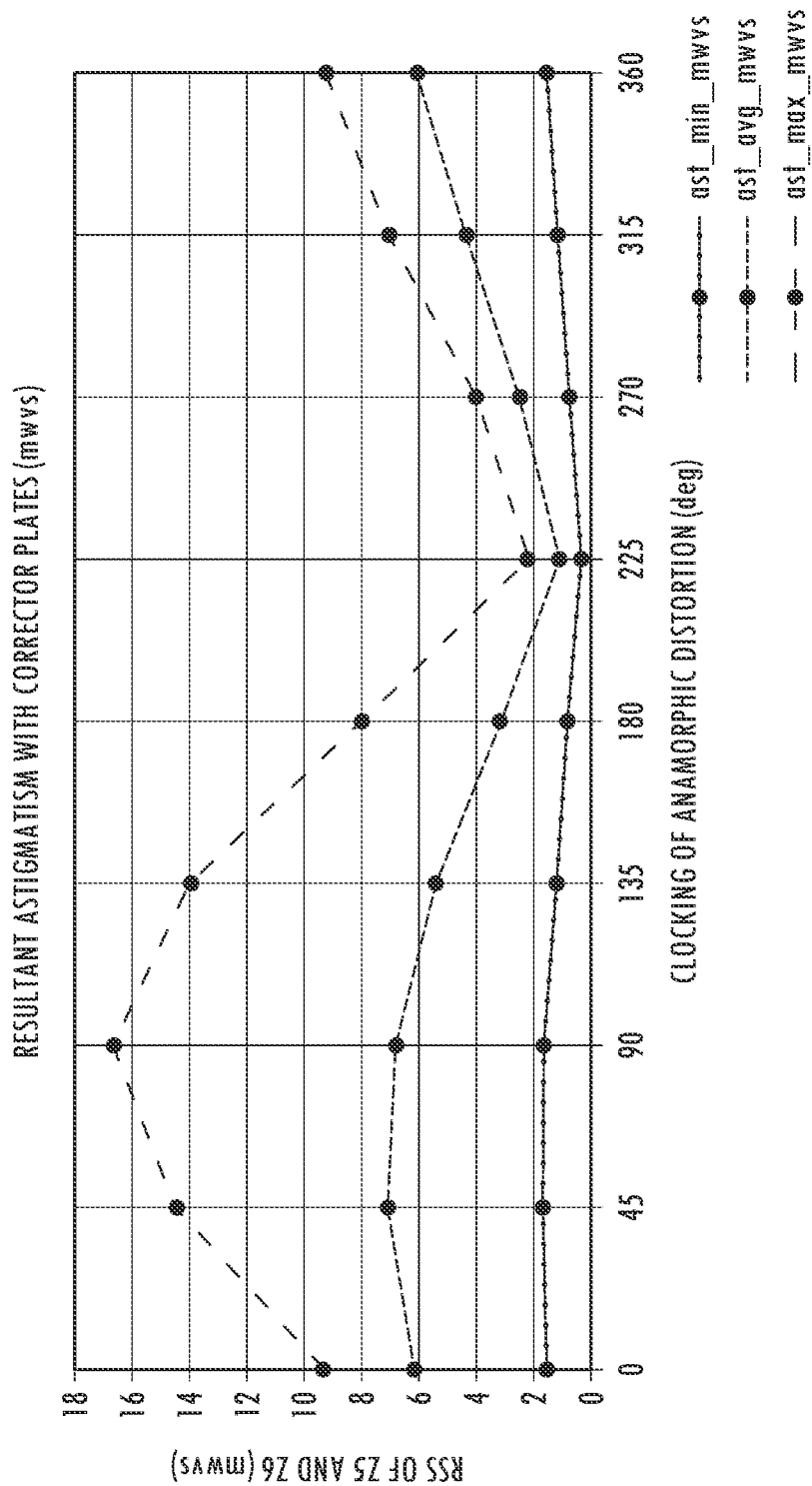
FIG. 9B is a graph illustrating the resultant astigmatism with the rotating corrector plates throughout the anamorphic clocking.

The wavefront aberration without corrector plates 60A and 60B is dominated by astigmatism generated by the cylinder lenses. The amount of astigmatism produced by the cylinder lenses increases by the square of the NA and proportional to the distance from the image plane to the cylinders. The unit mWvs is milli-waves, or 1/1000 of a wave. The comparison of FIGS. 9A and 9B show a significant improvement. The $R_{in}$=10 m solution has one-half the astigmatism with the corrector plates than for the $R_{in}$=5 m design.

The rotating corrector plates in the pupil have a hyperbolic paraboloid, or saddle shape on the inner surfaces. For this design, the peak-to-valley (P-V) of the plates is 53 nm. These can be fabricated by deterministic polishing techniques. The P-V is independent of the diameter of the plates, since this is the wavefront correction that is needed in the pupil. The difference in clocking of the two plates generate the magnitude of the correction, and the average of the two generates the clocking of the correction.

Figure 10:
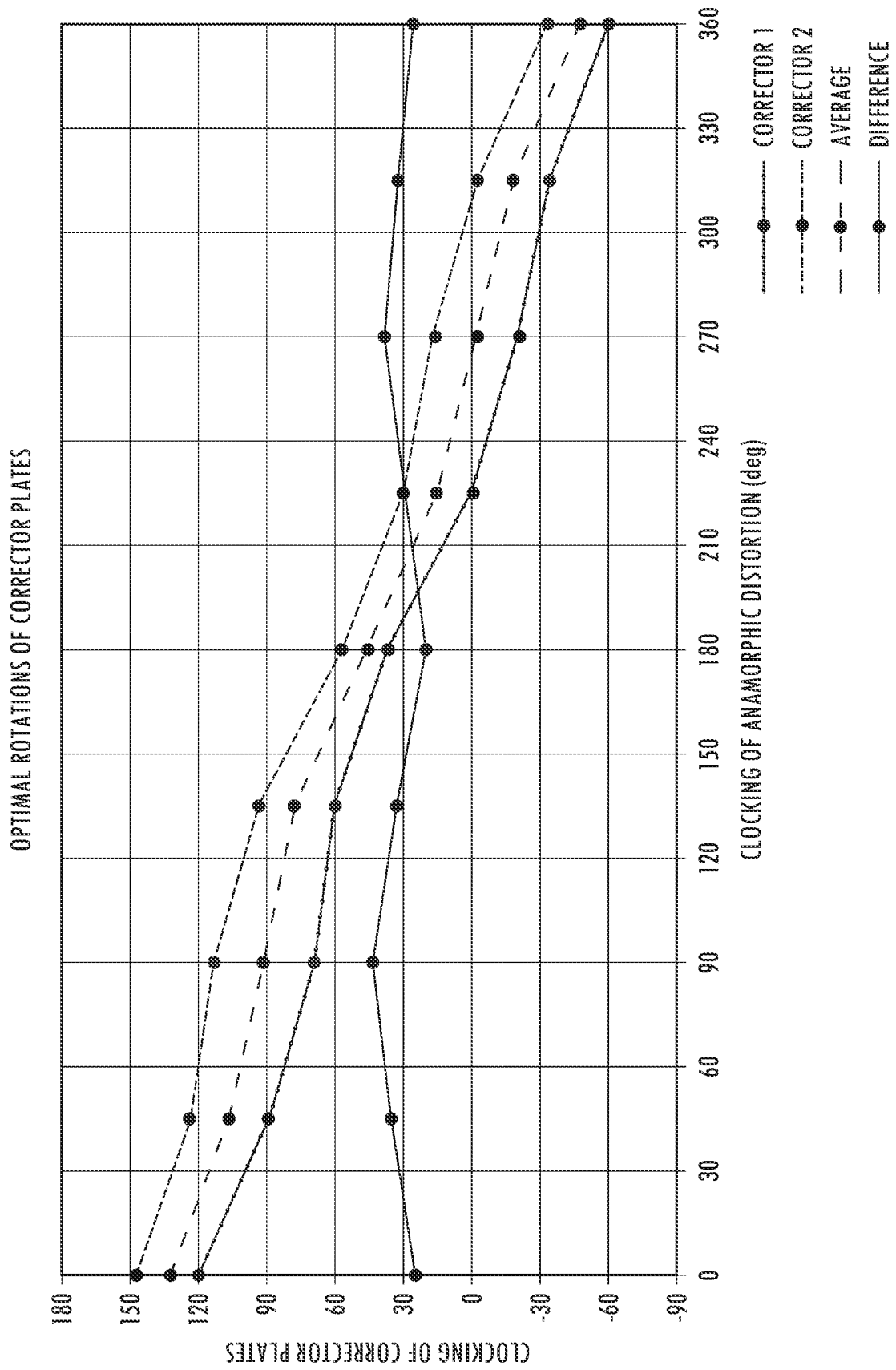
FIG. 10 is a graph illustrating optimal rotations of the rotatable corrector plates throughout the anamorphic clocking.

One example of optimal rotations of the rotating corrector plates is shown in FIG. 10. The precision of the rotations is not demanding to the opto-mechanical design, though the speed could be depending on the diameter of the pupil space. The difference is the angular separation from the nulled clockings of the two rotating corrector plates. The average is the average clockings of the two. The motions may fit to sinusoidal equations.

Figure 11A:
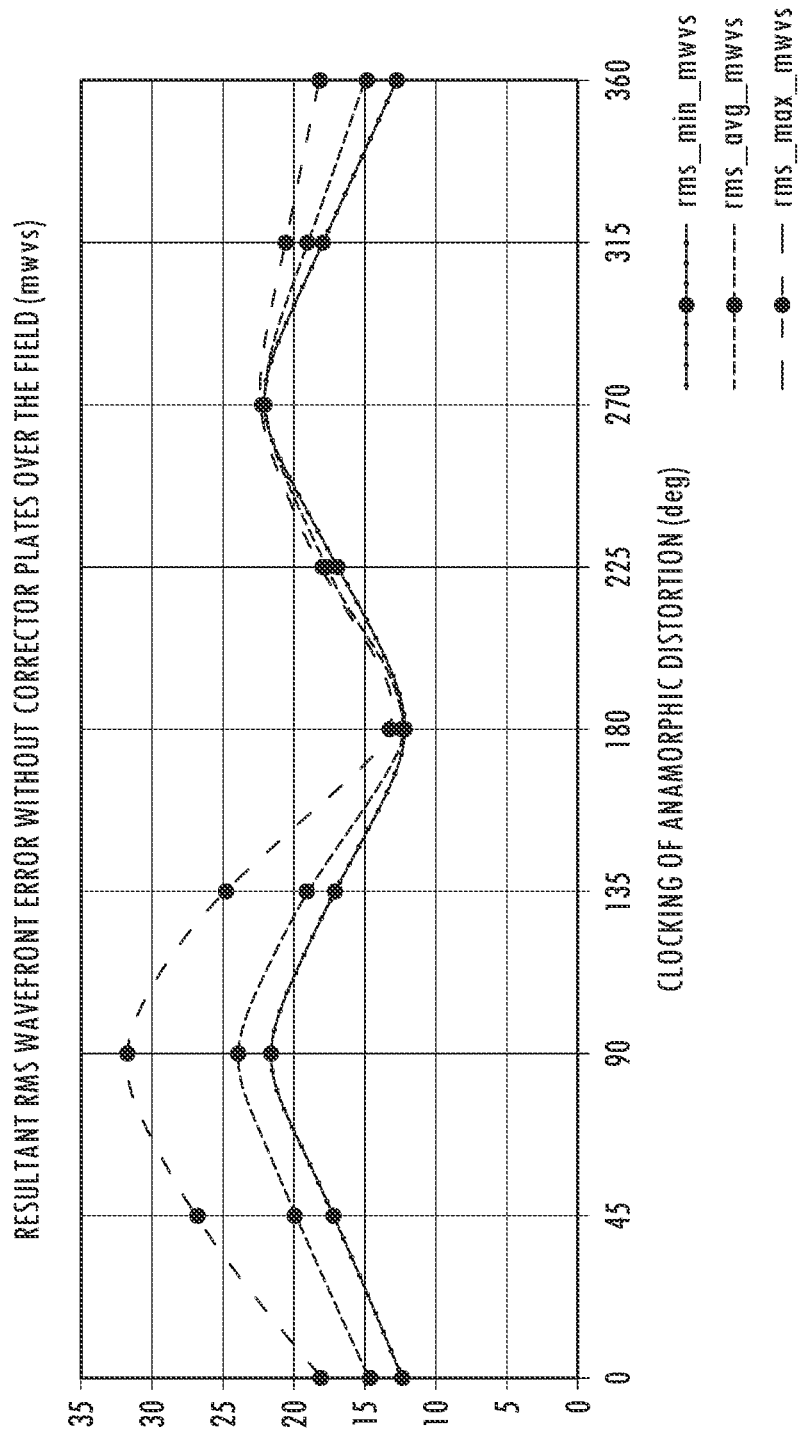
FIG. 11A is a graph illustrating the resultant RMS wavefront error without the rotating corrector plates over the field throughout the anamorphic clocking.
Figure 11B:
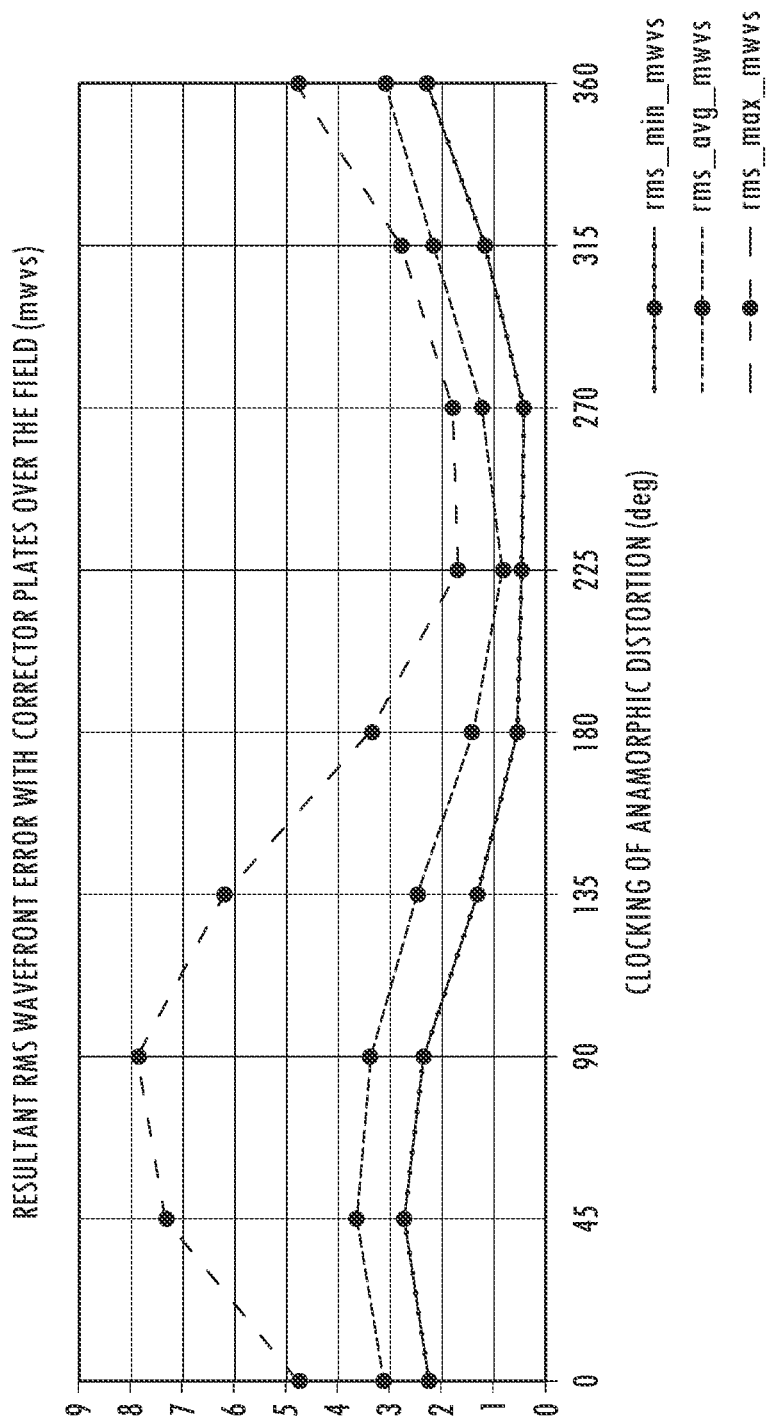
FIG. 11B is a graph illustrating the resultant RMS wavefront error with the rotating correcting plates over the field throughout the anamorphic clocking.

Without the rotating corrector plates 60A and 60B, the wavefront error shown in FIG. 11A is dominated by astigmatism. The residual left from the first and second cylindrical lens plates 40A and 40B is extremely low when the rotating corrector plates are used as shown in FIG. 11B. These calculated residuals are for the designed cylindrical lens plates 40A and 40B plus rotating corrector plates 60A and 60B, but does not include any unwanted contributions from the projection lens assembly 16. These are design residuals and do not take into account the errors from fabrication. All residuals are for generating ±100 ppm of anamorphic distortion, and will decrease for cases where less anamorphic distortion is needed.

The projection system 10 advantageously generates anamorphic magnification adjustment for all clockings and a range of magnitudes in a projection system 10 without producing unacceptable amount of focal plane deviation such as may be experienced with other lens arrangements. The projection system 10 may achieve a full range of anamorphic magnification adjustment with a mechanical motion that is small in distance for the movable lens plates in the field space and rotations of rotating corrector plates 60A and 60B in the pupil space. This is a results in a simpler, more robust, lower cost, faster full range of travel, and impart a minimal lateral vibration to the imaging system. The projection system 10 may achieve anamorphic magnification adjustment with minimal parasitic aberration effects with the addition of the rotating corrector plates 60A and 60B.

The described embodiments are preferred and/or illustrated, but are not limiting. Various modifications are considered within the purview and scope of the appended claims.

What is claimed is:

1. A magnification adjustable projection system comprising:
   an imaging system having an object or image space;
   a first pair of cylindrical lens plates located within the object or image space for contributing a first amount of magnification power to the imaging system, wherein the first pair of cylindrical lens plates includes a first cylindrical lens plate linearly movable relative to a second cylindrical lens plate;
   a second pair of cylindrical lens plates located within the object or image space in optical alignment with the first pair of cylindrical lens plates, the second pair of cylindrical lens plates contributing a second amount of magnification power to the imaging system, wherein the second pair of cylindrical lens plates comprises a third cylindrical lens plate linearly movable relative to a fourth cylindrical lens plate, wherein the first pair of cylindrical lens plates are separated along the optical axis relative to the second pair of cylindrical lens plates;
   a first actuator that adjusts a first distance between the first cylindrical lens plate and the second cylindrical lens plates for adjusting the first amount of magnification power; and
   a second actuator that adjusts a second distance between the third cylindrical lens plate and the fourth cylindrical lens plate for adjusting the second amount of magnification power, wherein the first pair of cylindrical lens plates has a first cylindrical transverse axis that extends substantially normal to an optical axis of the imaging system and the second pair of cylindrical lens plates has a second cylindrical transverse axis that extends substantially normal to the optical axis in the imaging system, wherein the first and second pairs of cylindrical lens plates are oriented such that the first cylindrical transverse axis is approximately 45° relative to the second cylindrical transverse axis.

2. The projection system of claim 1, wherein the imaging system further comprises a projection lens assembly and an illuminator for illuminating a beam of light through the projection lens assembly and onto the first and second pairs of cylindrical lens plates.

3. The projection system of claim 2, wherein the projection lens assembly further comprises a first rotating corrector plate located substantially in a pupil of the projection lens assembly and parallel to a second rotating corrector plate, wherein the first and second rotating corrector plates each have a shaped surface and are movable relative to each other to correct for astigmatism.

4. The projection system of claim 3, wherein the first rotating correct plate has a first shaped surface that rotates relative to a second shaped surface of the second rotating corrector plate.

5. The projection system of claim 4, wherein each of the first and second shaped surfaces is substantially a saddle shape that is defined by a 5th Fringe Zernike term $R^2 \cos(2\theta)$ which is defined in cylindrical coordinates, where R is a distance from an optical axis and $\theta$ is a clocking around a perimeter of the first or second rotating corrector plates.

6. The projection system of claim 1, wherein the first and second cylindrical lens plates have a cylindrical shape surfaces having substantially equal radii.

7. The projection system of claim 6, wherein the third and fourth cylindrical lens plates have cylindrical shape surfaces of substantially equal radii.

8. The projection system of claim 1, wherein the first and second actuators are controlled to perform anamorphic clocking.

9. The projection system of claim 1, wherein when the first and second cylindrical lens plates are separated by a distance greater than zero, an air lens is provided therebetween.

10. The projection system of claim 1, wherein the first cylindrical lens has a first cylindrical surface having a first radius of curvature and a second cylindrical surface having a second radius of curvature and the second cylindrical lens has a third cylindrical surface having a third radius of curvature and a fourth cylindrical surface having a fourth radius of curvature, wherein the first radius of curvature is substantially equal to the fourth radius of curvature and the second radius of curvature is substantially equal to the third radius of curvature, and wherein the second cylindrical surface faces the third cylindrical surface.

11. The projection system of claim 10, wherein the linear movement of the first cylindrical lens relative to the second cylindrical lens changes the anamorphic magnification throughout a positive and negative range of anamorphic magnifications.

12. The projection system of 11, wherein the third cylindrical lens has a fifth cylindrical surface having a fifth radius of curvature and a sixth cylindrical surface having a sixth radius of curvature and the fourth cylindrical lens has a seventh cylindrical surface having a seventh radius of curvature and an eighth cylindrical surface having an eighth radius of curvature, wherein the fifth radius of curvature is substantially equal to the eighth radius of curvature and the sixth radius of curvature is substantially equal to the seventh radius of curvature, and wherein the fifth cylindrical surface faces the sixth cylindrical surface.

13. The projection system of claim 12, wherein the linear movement of the third cylindrical lens relative to the fourth cylindrical lens changes the anamorphic magnification throughout a positive and negative range of anamorphic magnifications.

14. A magnification adjustable projection system comprising:
an imaging system having an object or image space;
a first pair of cylindrical lens plates located within the object or image space for contributing a first amount of magnification power to the imaging system, wherein the first pair of cylindrical lens plates includes a first cylindrical lens plate linearly movable relative to a second cylindrical lens plate;
a second pair of cylindrical lens plates located within the object or image space in optical alignment with the first pair of cylindrical lens plates, the second pair of cylindrical lens plates contributing a second amount of magnification power to the imaging system, wherein the second pair of cylindrical lens plates comprises a third cylindrical lens plate linearly movable relative to a fourth cylindrical lens plate, wherein the first pair of cylindrical lens plates are separated along the optical axis relative to the second pair of cylindrical lens plates;
a first actuator that adjusts a first distance between the first cylindrical lens plate and the second cylindrical lens plates for adjusting the first magnification;
a second actuator that adjusts a second distance between the third cylindrical lens plate and the fourth cylindrical lens plate for adjusting the second amount of magnification power, wherein the first pair of cylindrical lens plates has a first cylindrical transverse axis that extends substantially normal to an optical axis of the imaging system and the second pair of cylindrical lens plates have a second cylindrical transverse axis that extends substantially normal to the optical axis in the imaging system, wherein the first and second pairs of cylindrical lens plates are oriented such that the first cylindrical transverse axis is approximately 45° relative to the second cylindrical transverse axis; and
a projection lens assembly and an illuminator for illuminating a beam of light through the projection system and onto the first and second pairs of cylindrical lens plates, wherein the projection lens assembly further comprises a first rotating corrector plate located substantially parallel to a second rotating corrector plate, wherein the first and second rotating corrector plates each have a shaped surface and are movable relative to each other to correct for astigmatism.

15. The projection system of claim 14, wherein the first rotating corrector plate has a first shaped surface that rotates relative to a second shaped surface of the second rotating corrector plate.

16. The projection system of claim 15, wherein the first and second shaped surfaces each is substantially a saddle shape that is defined by a 5th Fringe Zernike term $R^2 \cos(2\theta)$ which is defined in cylindrical coordinates, where R is a distance from an optical axis and $\theta$ is a clocking around a perimeter of the first or second rotating corrector plates.

17. The projection system of claim 15, wherein the first and second rotating corrector plates rotate relative to each other to set a magnitude of the astigmatism correction and rotate together to set an orientation of the astigmatism.

18. The projection system of claim 14, wherein each of the first, second, third and fourth cylindrical lens plates is comprised of glass.

19. The projection system of claim 14, wherein the first and second actuators are controlled to perform anamorphic clocking.

20. The projection system of claim 14, wherein one of the first and second cylindrical lens plates has a first cylindrical surface having a first radius of curvature and the other of the first and second cylindrical lens plates has a second cylindrical surface with a second radius of curvature, wherein the first radius of curvature is substantially equal to the second radius of curvature.

21. The projection system of claim 20, wherein one of the third and fourth cylindrical lens plates has a third cylindrical surface having a third radius of curvature and the other of the third and fourth cylindrical lens plates has a fourth cylindrical surface with a fourth radius of curvature, wherein the third radius is substantially equal to the fourth radius of curvature.

22. The projection system of claim 14, wherein when the first and second cylindrical lens plates are separated by a distance greater than zero, an air lens is provided therebetween.

\* \* \* \* \*